United States Patent
Park et al.

(10) Patent No.: US 6,853,427 B2
(45) Date of Patent: Feb. 8, 2005

(54) LIQUID CRYSTAL DISPLAY DEVICE AND METHOD FOR MANUFACTURING THE SAME

(75) Inventors: Ki Bok Park, Kyongsangbuk-do (KR); Jin Hee Jung, Pusan-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 105 days.

(21) Appl. No.: 10/421,750

(22) Filed: Apr. 24, 2003

(65) Prior Publication Data
US 2004/0008313 A1 Jan. 15, 2004

(30) Foreign Application Priority Data
Jul. 13, 2002 (KR) ................................ 10-2002-0041003

(51) Int. Cl.[7] ................................................ G02F 1/13
(52) U.S. Cl. ....................................................... 349/129
(58) Field of Search .............................. 349/114, 129, 349/130, 141

(56) References Cited

U.S. PATENT DOCUMENTS

| | | | |
|---|---|---|---|
| 4,691,995 A | | 9/1987 | Yamazaki et al. |
| 5,309,264 A | | 5/1994 | Lien et al. |
| 5,608,556 A | | 3/1997 | Koma |
| 5,666,179 A | | 9/1997 | Koma |
| 6,788,375 B2 | * | 9/2004 | Ogishima et al. ........... 349/130 |

FOREIGN PATENT DOCUMENTS

| | | |
|---|---|---|
| EP | 0884626 A2 | 12/1998 |
| JP | 6235925 | 8/1994 |
| JP | 8101395 | 4/1996 |
| JP | 9061829 | 3/1997 |
| JP | 10177178 | 6/1998 |
| JP | 10333157 | 12/1998 |
| JP | 10333159 | 12/1998 |
| JP | 11133438 | 5/1999 |
| JP | 11142864 | 5/1999 |
| JP | 11248930 | 9/1999 |
| JP | 11326922 | 11/1999 |
| WO | IB-WO 00/08521 | 2/2000 |

OTHER PUBLICATIONS

Y. Tanaka, et al. "Late–News Paper: A New Design to Improve Performance and Simplify the Manufacturing Process of High–Quality MVA TFT–LCD Panels." SID 99 Digest, pp. 206–209.

* cited by examiner

Primary Examiner—James A. Dudek
(74) Attorney, Agent, or Firm—McKenna Long & Aldridge LLP

(57) ABSTRACT

An LCD device includes first and second substrates; an insulating layer on the first substrate, the insulating layer comprising an inclined sidewall portion exposing a portion of the first substrate; gate and data lines crossing each other and defining pixel region on the first substrate; a common auxiliary electrode on the inclined sidewall portion of the insulating layer; a pixel electrode on the first substrate; a common electrode on the second substrate; and a liquid crystal layer between the first and second substrates.

23 Claims, 7 Drawing Sheets

LIQUID CRYSTAL DISPLAY DEVICE AND METHOD FOR MANUFACTURING THE SAME

This application claims the benefit of the Korean Application No. P2002-41003 filed on Jul. 13, 2002, which is hereby incorporated by reference for all purposes as if fully set forth herein.

BACKGROUND OF THE INVENTION

1. Field of the Invention

The present invention relates to a liquid crystal display (LCD) device and a method of fabricating the same. More particularly, the present invention relates to a liquid crystal display device and a method for fabricating the same having a common auxiliary electrode capable of preventing electric field dispersion, stabilizing the alignment of liquid crystal material, and wherein an aperture ratio of the LCD device is increased.

2. Discussion of the Related Art

Over time, demands on display technology have gradually increased and resulted in the development of a variety of flat display panels including liquid crystal displays (LCDs), plasma display panels (PDPs), electro luminescent displays (ELDs), vacuum fluorescent displays (VFDs), etc. Some of the aforementioned flat panel display panels are currently being employed as displays of various apparatuses.

Owing to their excellent picture display quality, light weight, thin dimensions, and low power consumption, LCDs are being developed for use as televisions (TVs), capable of receiving and displaying broadcasted signals, and are widely used in portable displays as monitors of notebook computers and the like.

Despite various technical developments in the LCD technology, however, research in enhancing picture quality of LCD devices has been lacking in some respects compared to research in other features and advantages of LCD devices. Therefore, to increase the use of LCD devices as displays in various fields of application, LCD devices capable of expressing high quality images (e.g., images having a high resolution and a high luminance) with large-sized screens, while still maintaining a light weight, minimal dimensions, and low power consumption must be developed.

LCDs generally include a liquid crystal display panel for displaying a picture and a driving part for providing driving signals to the liquid crystal display panel. The LCD panel generally includes first and second glass substrates bonded to each other and spaced apart from each other by a cell gap. A layer of liquid crystal material is injected into the gap between the first and second glass substrates. Light transmittance characteristics of the liquid crystal material may be selectively altered by electric fields generated between the first and second glass substrates to display images on the LCD panel.

Molecules of liquid crystal material contained between upper and lower substrates of Twisted Nematic (TN) mode LCDs are aligned along longitudinal directions substantially parallel with the lower and upper substrates and are generally spirally twisted to a predetermined pitch such that the alignment of the longitudinal directions within the liquid crystal molecules is continuously changeable.

The light transmittance characteristics of TN mode LCDs generally varies across each gray level in accordance with a corresponding viewing angle. Further, TN mode LCDs distribute light symmetrically in right and left directions while distributing light asymmetrically in lower and upper directions. Accordingly, gray inversion of images is generated.

Use of Vertical Alignment (VA) mode LCDs has been proposed to overcome the aforementioned problems and compensate for variations in light transmittance characteristics across viewing angles. In VA mode LCDs, a pixel region is divided into a plurality of domains, wherein liquid crystal material aligned in different directions in each of the domains. In VA mode LCDs either a protrusion or an electric field inducing window is formed on the upper substrate while a common auxiliary electrode (i.e., side electrode) is formed on the lower substrate.

A related art LCD device will now be explained in greater detail below.

FIG. 1 illustrates a schematic view of a related art LCD device and FIG. 2 illustrates a cross-sectional view of the related art LCD device shown in FIG. 1 taken along line I–I'.

A related art LCD device generally includes opposing lower and upper substrates 1 and 10 and a layer of liquid crystal material 16 interposed between the lower and upper substrates 1 and 10.

The lower substrate 1 includes a plurality of gate lines 2 and data lines 4 crossing each other, pixel regions defined at each of the crossings of the gate and data lines 2 and 4, a gate electrode (not shown) extending to both sides of the gate line 2, a gate insulating layer (not shown) formed over the lower substrate 1 and on the gate line 2, an active region 3 formed over the gate insulating layer in a region above the gate line 2, a pixel electrode 7 formed within the pixel region and formed out of the same layer as that of the active region 3, a source electrode 4a extending from the data line 4 and overlapping a first portion of the active region 3, a drain electrode 4b formed apart from the source electrode 4a and overlapping a second portion of the active region 3 as well as a predetermined portion of the pixel region 7, an interlayer passivation film 6 formed over an entire surface of the lower substrate 1 and on the pixel electrode 7, an orientation control electrode 5 formed over the interlayer passivation film 6 and overlapping the circumference of the pixel electrode 7, and a first alignment layer 8 formed over the lower substrate 1 and on the orientation control electrode 5. Orientation control electrodes 5 of adjacent pixel regions are connected to each other.

The upper substrate 10 includes a black matrix layer (not shown) for preventing light leakage in regions outside the pixel regions of the lower substrate 1, a color filter layer (not shown) formed in regions over the upper substrate 10 corresponding to the black matrix layer and the pixel regions of the lower substrate 1, a common electrode 13 formed over the color filter layer wherein the common electrode 13 has an "X"-shaped orientation control window 14, and a second alignment layer 15 formed over the upper substrate 10 and on the common electrode 13.

Referring to FIG. 2, when an electric field is generated between the pixel electrode 7 and the common electrode 13, a fringe field (designated by the solid arrows) is generated by the orientation control window 14 within the common electrode 13. Affected by the fringe field, liquid crystal molecules become aligned differently at opposing sides of the orientation control window 14 and, accordingly, compensate for variations in light transmittance characteristics across viewing angles.

Use of LCD devices such as those illustrated in FIGS. 1 and 2 is disadvantageous for the following reasons. For example, the orientation control electrode 5 is formed of an opaque metal and is spaced apart from the data line 4 by a predetermined distance to prevent the generation of an electrical short. Because the orientation control electrode 5 is spaced apart from the data line 4, a width of the pixel region decreases thereby decreasing aperture ratio and luminance of the LCD device. To compensate, the related art LCD devices illustrated in FIGS. 1 and 2 require backlights of increased brightness and therefore require an increased level of power consumption.

Moreover, electrical fields generated in TN mode LCD devices face outwardly toward the perimeter of the pixel. Accordingly, alignment of the liquid crystal material becomes unstable and light leakage is generated at the perimeter of each pixel region, decreasing the overall brightness of the LCD device. Furthermore, alignment of the liquid crystal material becomes unstable when a light force is applied the LCD panel and a spot is generated that is difficult to remove due to a slow response time of the liquid crystal material.

SUMMARY OF THE INVENTION

Accordingly, the present invention is directed to a liquid crystal display device and method of fabricating the same that substantially obviates one or more of the problems due to limitations and disadvantages of the related art.

An advantage of the present invention provides an LCD device and a method of fabricating the same wherein an alignment of liquid crystal material is stable and a rapid response time and high aperture ratio may be obtained.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, an LCD device may, for example, include first and second substrates; an insulation layer on the first substrate, the insulation layer having an inclined sidewall portion exposing a portion of the first substrate; a plurality of gate and data lines crossing each other to define pixel regions on the first substrate; a common auxiliary electrode on the inclined sidewall portion of the insulation layer; a pixel electrode on the first substrate; a common electrode on the second substrate; and a liquid crystal layer between the first and second substrates.

In one aspect of the present invention, a method for manufacturing an LCD device may, for example, include providing a first substrate; providing a second substrate; forming an insulation layer on a first substrate, wherein the insulation layer comprises an inclined sidewall portion exposing a portion of the first substrate; forming gate and data lines to cross each other on the insulation layer; forming a common auxiliary electrode on the inclined sidewall portion of the insulation layer; forming a passivation layer and a pixel electrode on the first substrate; and forming a common electrode on the second substrate.

In another aspect of the present invention, a method for manufacturing an LCD device may, for example, include providing a first substrate; forming an insulation layer on the first substrate, the insulation layer having an inclined sidewall portion exposing a portion of the first substrate; forming a gate line along a first direction on the insulation layer and a common auxiliary electrode on the inclined sidewall portion of the insulation layer; forming a gate insulating layer on the first substrate; forming a data line along a second direction on the gate insulating layer, the second direction being substantially perpendicular to the first direction; forming a passivation layer on the first substrate; and forming a pixel electrode on the first substrate.

In yet another aspect of the present invention, a method for manufacturing an LCD device may, for example, include providing a first substrate; forming an insulation layer on the first substrate; forming a gate line on the insulation layer in one direction; forming a gate insulating layer on the gate line; etching the gate insulating layer and the insulation layer to form inclined sidewall portion; forming a data line on the gate insulating layer and a common auxiliary electrode on the inclined sidewall portion of the insulation layer; forming a passivation layer on the first substrate; and forming a pixel electrode on the first substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to embodiments of the present invention, examples of which are illustrated in the accompanying drawings. Wherever possible, the same reference numbers will be used throughout the drawings to refer to the same or like parts.

According to the principles of the present invention, an LCD device may, for example, include a common auxiliary electrode (i.e., a side electrode) formed on an inclined sidewall portion of an insulation layer formed on a lower substrate. Accordingly, alignment efficiency of liquid crystal material may be improved and a dispersion of alignment directions of liquid crystal molecules may be prevented such that alignment directions of liquid crystal molecules may be stabilized. According to the principles of the present invention, the common auxiliary electrode may be simultaneously formed with the forming of a gate line or a data line.

Accordingly, common auxiliary electrodes and methods for manufacturing the same will now be described in greater detail.

According to the principles of the present invention, a common auxiliary electrode may be formed on an inclined sidewall portion of an organic insulation layer of a lower substrate. In a first aspect of the present invention, the common auxiliary electrode may be formed simultaneously with a formation of the gate line. In a second aspect of the present invention, the common auxiliary electrode may be formed simultaneously with a formation of the data line.

Figure 3:
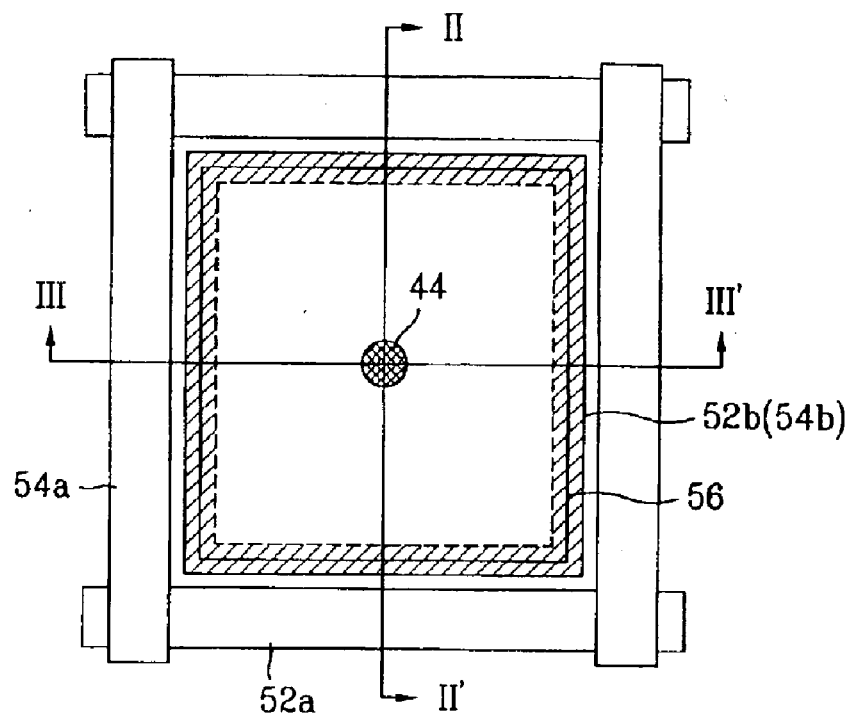
FIG. 3 illustrates a schematic view of a unit pixel of an LCD device according to the principles of the present invention.
Figure 4:
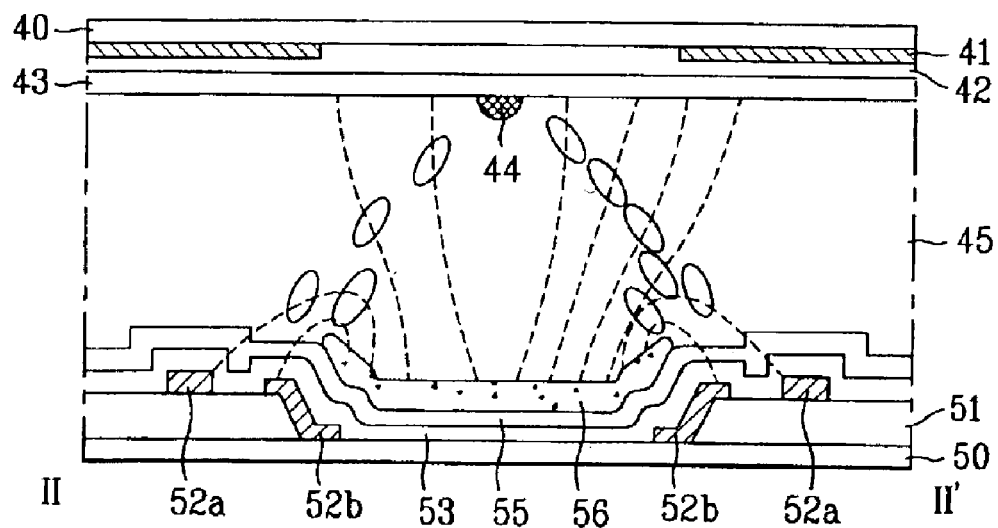
FIG. 4 illustrates a cross-sectional view of the LCD device shown in FIG. 3 taken along line II–II' according to a first aspect of the present invention.

FIG. 3 illustrates a schematic view of a unit pixel of an LCD device according to the principles of the present invention. FIG. 4 illustrates a cross-sectional view of the LCD device shown in FIG. 3 taken along line II–II' according to a first aspect of the present invention.

Referring to FIGS. 3 and 4, the LCD device according to the first aspect of the present invention may, for example, include opposing lower and upper substrates 50 and 40, respectively, spaced apart from each other by a predetermined distance and a layer of liquid crystal material 45 interposed between the lower and upper substrates 50 and 40. As will be described in greater detail below, the lower substrate 50 may, for example, include a plurality of gate lines and data lines 52a and 54a, respectively, formed to cross each other and defining pixel regions where they cross. Further, as will be described in greater detail below, a pixel electrode 56 may be formed within each pixel region. Although not shown, a thin film transistor (TFT) may be formed at crossings of the gate and data lines 52a and 54a. The TFT may be used as a switch capable of transmitting signals applied to the data line 54a to the pixel electrode 56 in response to a signal applied to the gate line 52a.

According to the first aspect of the present invention, an organic insulation layer 51 having an inclined sidewall portion may be formed on the lower substrate 50 such that the inclined sidewall portion exposes the lower substrate 50 in regions of the lower substrate corresponding to the pixel regions. In one aspect of the present invention, the organic insulation layer 51 may be formed out of an organic insulating material such as BenzoCycloButene (BCB), or photoacrylic resin, and the like. The gate line 52a may be formed on the organic insulation layer 51 along a first direction and a common auxiliary electrode 52b may be formed on the inclined sidewall portion of the organic insulation layer 51 and overlap at least a portion of the perimeter of the pixel electrode 56. A gate insulating layer 53 may be formed over the entire surface of the lower substrate 50 and on the gate line 52a and the common auxiliary electrode 52b. A data line 54a may be formed on the gate insulating layer 53 to substantially perpendicularly cross the gate line 52a. A passivation layer 55 may be formed over the entire surface of the lower substrate 50 including the data line 54a. The pixel electrode 56 may be formed on the passivation layer 55 within the pixel region.

According to the first aspect of the present invention, the upper substrate 40 may, for example, include a black matrix layer 41 for preventing light leakage in regions outside the pixel regions of the lower substrate 50. The upper substrate 40 may also include a color filter layer 42 for selectively transmitting light having predetermined wavelengths at portions corresponding to pixel regions of the black matrix layer 41. A common electrode 43 may be formed over the entire surface of the upper substrate 40 and on the color filter layer 42. Further, at least one dielectric protrusion 44 may be formed on a portion of the common electrode 43 in a pattern substantially symmetric about the center of the pixel region.

Referring to FIG. 4, when an electric field is formed between the pixel electrode 56 on the lower substrate 50 and the common electrode 43 on the upper substrate 40, the dielectric protrusion 44, formed on the common electrode 43 of the upper substrate 40, induces a fringe field (designated by the dotted lines of FIG. 4). The dielectric protrusion 44 distorts the electric field applied to the layer of liquid crystal material 45. Due to the presence of the fringe field, liquid crystal molecules may be asymmetrically aligned with respect to the dielectric protrusion 44 and light transmittance characteristics of the liquid crystal material may be compensated for across a range of viewing angles. Accordingly, the dielectric protrusion 44 uniformly stabilizes an image within the pixel region and generates a multi-domain effect within the LCD device. In one aspect of the present invention, at least one dielectric protrusion 44 may be formed on the common electrode 43 of the upper substrate 40. According to the principles of the present invention, an electric field inducing window may be provided as a hole or slit within the common electrode 43 as an alternative to forming the dielectric protrusion 44 on the common electrode 43.

Figure 1:
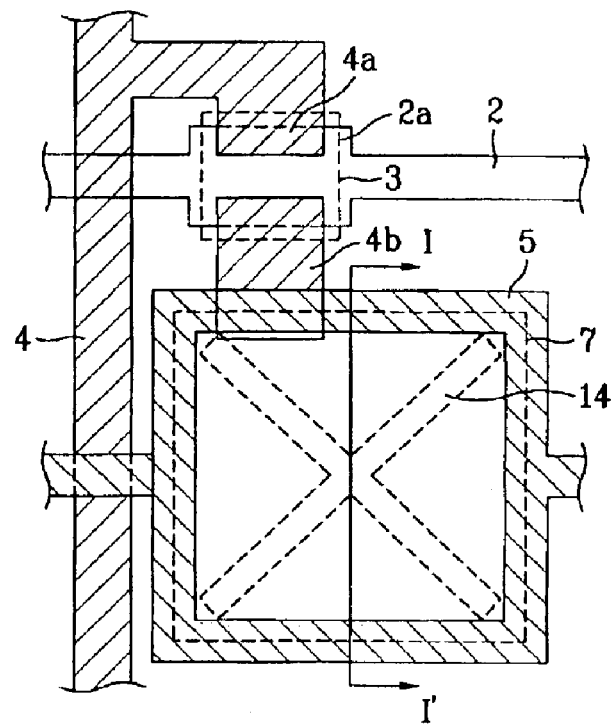
FIG. 1 illustrates a schematic view of a unit pixel in a related art LCD device.
Figure 2:
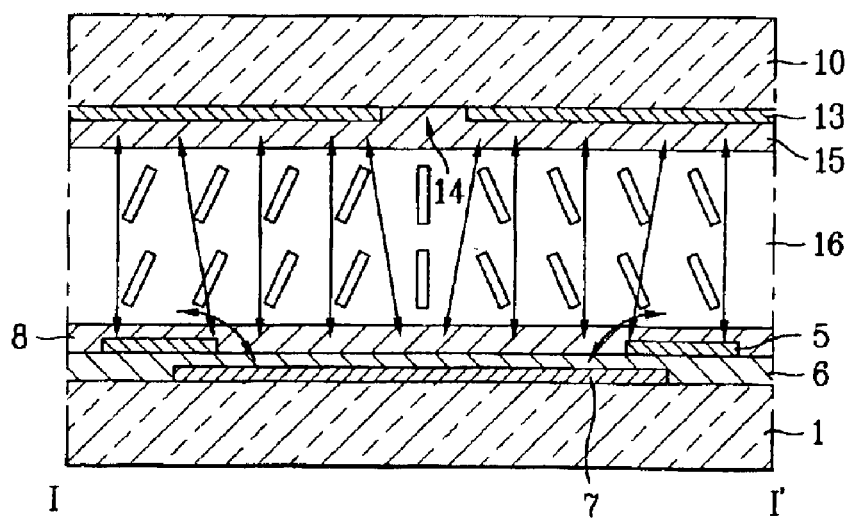
FIG. 2 illustrates a cross-sectional view of the related art LCD device shown in FIG. 1 taken along line I–I'.

According to the principles of the present aspect, the fringe field may be reinforced by the common auxiliary electrode 52b overlapping at least a portion of the perimeter of the pixel electrode 56. As a result of the reinforcement, liquid crystal molecules may be prevented from facing outwardly at the perimeter of the pixel electrode 56 such that liquid crystal molecules are uniformly aligned. Due to the presence of the common auxiliary electrode 52b, the area of the pixel region affected by the electric field increases. As a result, the LCD device of the first aspect of the present invention may have an increased aperture ratio compared to aperture ratios of LCD devices such as those illustrated in FIGS. 1 and 2. Further, the efficiency with which liquid crystal molecules at the perimeter of the pixel electrode 56 may be driven increases. As a result, the time required for the layer of liquid crystal material 45 to stabilize within the LCD device, and therefore the response time, may be reduced compared to stabilization and response times of LCD devices such as those illustrated in FIGS. 1 and 2.

A method for manufacturing the LCD device according to the first aspect of the present invention will now be described in greater detail.

FIGS. 5A to 5D illustrate cross-sectional views in fabricating the LCD device shown in FIG. 3 taken along line II–II' according to a first aspect of the present invention.

A method for fabricating the lower substrate 50 will now be described.

Figure 5A:
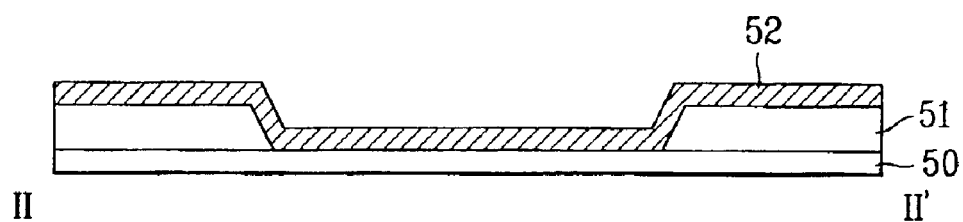
FIGS. 5A to 5D illustrate cross-sectional views in fabricating the LCD device shown in FIG. 3 taken along line II–II' according to the first aspect of the present invention.

Referring to FIG. 5A, an organic insulation layer 51 may be formed on the lower substrate 50 and selectively etched to expose portions of the lower substrate 50 in regions corresponding to the pixel region and to form an inclined sidewall portion in the organic insulation layer 51. In one aspect of the present invention, the organic insulation layer 51 may be formed out of an organic insulating material such as BenzoCycloButene (BCB), photo-acrylic resin, and the like.

Next, a first metal layer 52 may be formed over the entire surface of the lower substrate 50 and on the organic insulation layer 51. In one aspect of the present invention, the first metal layer may be formed by a sputtering process.

Figure 5B:
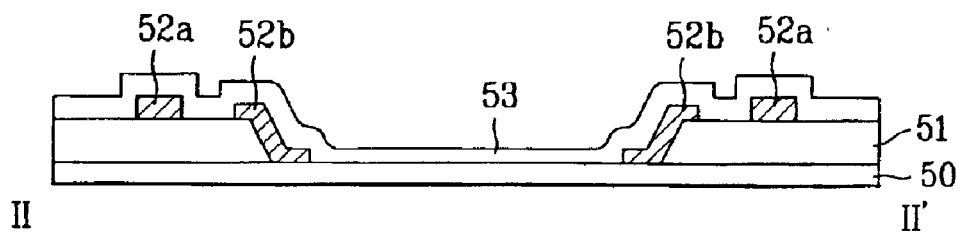

Referring to FIG. 5B, the first metal layer 52 may be selectively patterned to form a gate line 52a arranged along a first direction, wherein the gate line includes a gate pad (not shown) and a gate electrode (not shown), and a common auxiliary electrode 52b on the inclined sidewall portion of the organic insulation layer 51 and substantially surrounding the pixel region. In one aspect of the present invention, the first metal layer 52 may be formed of a material such as Al, Mo, Cr, Ta Al alloy, and the like.

Next, a gate insulating layer 53 may be deposited over the entire surface of the lower substrate 50 and on the gate line 52a and common auxiliary electrode 52b. In one aspect of the present invention, the gate insulating layer 53 may be formed of a material such as $SiN_x$, $SiO_x$, and the like, by a deposition method such as Plasma Enhanced Chemical Vapor Deposition (PECVD). In another aspect of the present invention, the gate insulating layer 53 may be formed of a material such as BenzoCycloButene (BCB), acrylic resin, polyimide compound, and the like, to obtain an LCD device having an increased high aperture ratio.

Although not shown, first and second semiconductor layers (e.g., amorphous silicon and impurity doped amorphous silicon layers) may be formed over the entire surface of the lower substrate 50 to form an active layer (not shown). The first and second semiconductor layers may then selectively patterned using a mask to be formed into an island-shaped active layer (not shown) above the gate electrode.

Figure 5C:
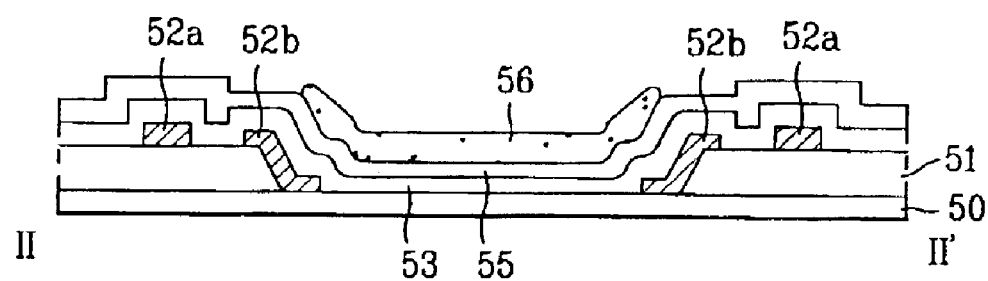

Referring to FIG. 5C, a second metal layer may be formed over the entire surface of the lower substrate 50 and on the active layer (not shown) and selectively patterned to form the data line 54a (shown in FIG. 3) arranged along a second direction, substantially perpendicular to the first direction, to define the pixel region, wherein the data line includes data pads (not shown) arranged at opposing ends of the data line 54a. In one aspect of the present invention, the second metal layer may be formed out of a material such as Al, Mo, Cr, Ta, Al alloy, and the like, by a deposition method such as sputtering.

Although not shown, a source electrode may be formed to extend from the data line 54a toward the active layer, and a drain electrode (not shown) may be formed to be spaced apart from the source electrode. During the patterning of the second metal layer 54, the second semiconductor layer may become over-etched between the source and drain electrodes.

After patterning the second metal layer, a passivation layer 55 may be, formed over the entire surface of the lower substrate 50 and on the data line 54a. In one aspect of the present invention, the passivation layer 55 may be formed out of a material such as BenzoCycloButene (BCB), acrylic resin, polyimide compound, $SiN_x$, or $SiO_x$, and the like. After being formed over the lower substrate 50, the passivation layer 55 may be selectively etched using a photomask process to form so that first, second, and third contact holes (not shown) above the drain electrode, the gate pad, and the data pad, respectively.

Next, a transparent conductive metal layer may be formed over the passivation layer 55 and within the first, second, and third contact holes. Accordingly, a portion of the transparent conductive metal layer provided in the pixel region (i.e., the pixel electrode 56) electrically contacts the drain electrode through the first contact hole, a portion of the transparent conductive metal layer provided on the passivation layer and adjacent the second contact hole (i.e., gate pad terminal) may contact the gate pad, and a portion of the transparent conductive metal layer provided on the passivation layer and adjacent the third contact hole (i.e., data pad terminal) may contact the date pad. In one aspect of the present invention, the pixel electrode 56 may be formed to overlap with at least a portion of the common auxiliary electrode 52b formed on the inclined sidewall portion of the organic insulation layer 51.

A method for fabricating the upper substrate 40 will now be described.

Figure 5D:
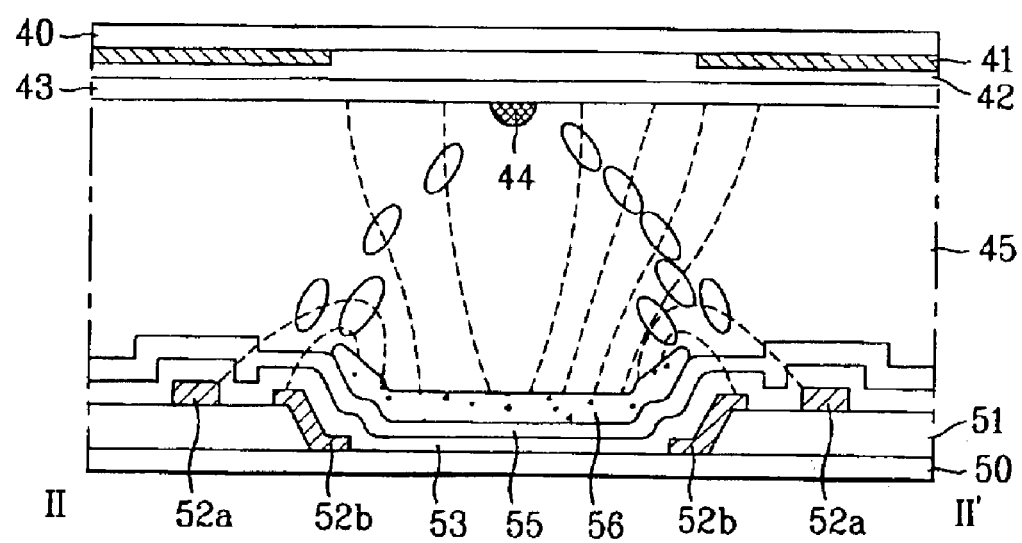

Referring to FIG. 5D, a layer of black matrix material may be formed over the upper substrate 40 and then patterned to form a black matrix layer 41.

Next, a color filter layer 42 may be formed over the upper substrate 40 and on the black matrix layer 41. In one aspect of the present invention, the color filter layer 42 may comprise red, green, and blue (R, G, and B) elements formed in regions corresponding to respective pixel regions.

Next, a common electrode 43 may be formed over the entire surface of the upper substrate 40 and on the color filter layer 42. In one aspect of the present invention, the common electrode 43 may be formed out of a transparent conductive material such as ITO.

Subsequently, a photosensitive material may be formed over the common electrode 43 and selectively patterned by photolithography to form at least one dielectric protrusion 44. According to the principles of the present invention, the dielectric protrusion 44 may distort electric fields applied to the layer of liquid crystal material 45. In one aspect of the present invention, the dielectric protrusion 44 may be formed of a photosensitive material having a dielectric constant substantially equal to or less than the dielectric constant of the liquid crystal material. For example, the dielectric protrusion 44 may be formed out of a material having the dielectric constant of about 3 or less. Accordingly, the dielectric protrusion 44 may be formed out of a material such as photoacrylate, BenzoCycloButene (BCB), and the like. In another aspect of the present invention, an electric field inducing window (not shown) may be provided as a hole or slit within the common electrode 43 as an alternative to forming the dielectric protrusion 44.

Next, a spacer (not shown) and sealant material may be formed on one of the lower and upper substrates 50 and 40 followed by bonding of the lower and upper substrates 50 and 40 together. Subsequently, liquid crystal material may be injected between the lower and upper substrates 50 and 40, thereby forming a layer of liquid crystal material 45. In one aspect of the present invention, the liquid crystal material may have either a positive or negative dielectric anisotropy. In another aspect of the present invention, a chiral dopant may be added to the liquid crystal material 45.

In a second aspect of the present invention, a common auxiliary electrode may be formed on an inclined sidewall portion of an organic insulation layer of a lower substrate. Further, the common auxiliary electrode may be formed simultaneously with a formation of the data line.

Figure 6:
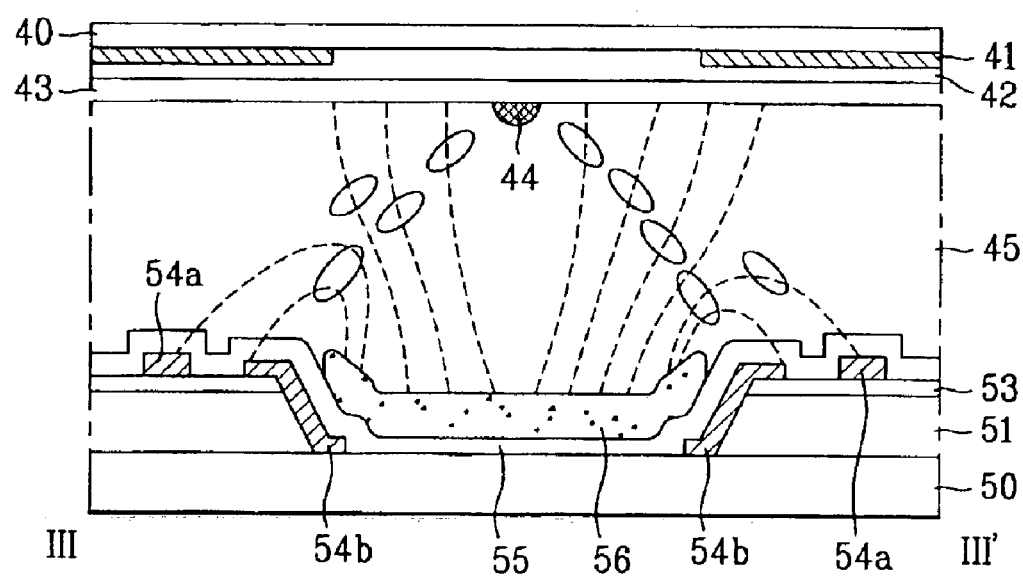
FIG. 6 illustrates a cross-sectional view of an LCD device shown in FIG. 3 taken along line III–III' according to a second aspect of the present invention.

FIG. 6 illustrates a cross-sectional view of an LCD device shown in FIG. 3 taken along line III-III' according to the second aspect of the present invention.

Referring to FIGS. 3 and 6, the LCD device according to the second aspect of the present invention may, for example, include opposing lower and upper substrates 50 and 40, respectively, spaced apart from each other by a predetermined distance and a layer of liquid crystal material 45 interposed between the lower and upper substrates 50 and 40. As will be described in greater detail below, the lower substrate 50 may, for example, include a plurality of gate and data lines 52a and 54a, respectively, formed to cross each other and defining pixel regions where they cross. Further, and as will be discussed in greater detail below, a pixel electrode 56 may be formed within each pixel region. Although not shown, a thin film transistor (TFT) may be formed at crossings of the gate and data lines 52a and 54a. The TFT may be used as a switch capable of transmitting signals applied to the data line 54a to the pixel electrode 56 in response to a signal applied to the gate line 52a.

According to the second aspect of the present invention, an organic insulation layer 51 having an inclined sidewall portion may be formed on the lower substrate 50 such that the inclined sidewall portion exposes the lower substrate 50 in regions of the lower substrate 50 corresponding to the pixel regions. In one aspect of the present invention, the organic insulation layer 51 may be formed out of an organic insulating material such as BenzoCycloButene (BCB), or photo-acrylic resin, and the like. The gate line 52a may be formed on the organic insulation layer 51 along a first direction and a gate insulating layer 53 may be formed over the entire surface of the lower substrate 50 and on the gate line 52a. A data line 54a may be formed over the gate insulating layer 53 to substantially perpendicularly cross the gate insulating layer 53 and a common auxiliary electrode 54b may be formed on the inclined sidewall portion of the organic insulation layer 51 and overlap at least a portion of the perimeter of the pixel electrode 56. A passivation layer 55 may be formed over the entire surface of the lower substrate 50 and on the data line 54a and the common auxiliary electrode 54b. The pixel electrode 56 may be formed on the passivation layer 55 within the pixel region.

According to the second aspect of the present invention, the upper substrate 40 may, for example, include a black matrix layer 41 for preventing light leakage in regions outside the pixel regions of the lower substrate 50. The upper substrate 40 may also include a color filter layer 42 for selectively transmitting light having predetermined wavelengths at portions corresponding to pixel regions of the black matrix layer 41. A common electrode 43 may be formed over the entire surface of the upper substrate 40 and on the color filter layer 42. Further, at least one dielectric protrusion 44 may be formed on a portion of the common electrode 43 in a pattern substantially symmetric about the center of the pixel region.

Referring to FIG. 6, when an electric field is formed between the pixel electrode 56 on the lower substrate 50 and the common electrode 43 on the upper substrate 40, the dielectric protrusion 44, formed on the common electrode 43 of the upper substrate 40, induces a fringe field (designated by the dotted lines of FIG. 6). The dielectric protrusion 44 distorts the electric field applied to the layer of liquid crystal material 45. Due to the presence of the fringe field, liquid crystal molecules may be asymmetrically aligned with respect to the dielectric protrusion 44 and light transmittance characteristics of the liquid crystal material may be compensated for across a range of viewing angles. Accordingly, the dielectric protrusion 44 uniformly stabilizes an image within the pixel region and generates a multi-domain effect within the LCD device. In one aspect of the present invention, at least one dielectric protrusion 44 may be formed on the common electrode 43 of the upper substrate 40. According to the principles of the present invention, an electric field inducing window may be provided as a hole or slit within the common electrode 43 as an alternative to forming the dielectric protrusion 44 on the common electrode 43.

According to the principles of the present invention, the fringe field may be reinforced by the common auxiliary electrode 54b overlapping at least a portion of the perimeter of the pixel electrode 56. As a result of the reinforcement, liquid crystal molecules may be prevented from facing outwardly at the perimeter of the pixel electrode 56 such that liquid crystal molecules are uniformly aligned. Due to the presence of the common auxiliary electrode 52b, the area of the pixel region affected by the electric field increases. As a result, the LCD device of the first aspect of the present invention may have an increased aperture ratio compared to aperture ratios of LCD devices such as those illustrated in FIGS. 1 and 2. Further, the efficiency with which liquid crystal molecules at the perimeter of the pixel electrode 56 may be driven increases. As a result, the time required for the layer of liquid crystal material 45 to stabilize within the LCD device, and therefore the response time, may be reduced compared to stabilization and response times of LCD devices such as those illustrated in FIGS. 1 and 2.

A method for manufacturing the LCD device according to the second aspect of the present invention will now be described in greater detail.

FIGS. 7A to 7D illustrate cross-sectional views in fabricating the LCD device shown in FIG. 3 taken along line III–III' according to a second aspect of the present invention.

Figure 7A:
FIGS. 7A to 7D illustrate cross-sectional views in fabricating the LCD device shown in FIG. 3 taken along line III–III' according to the second aspect of the present invention.

Referring to FIG. 7A, the organic insulation layer 51 and the first metal layer 52 may be successively formed over the entire surface of the lower substrate 50. In one aspect of the present invention, the first metal layer 52 may be formed of a material such as Al, Mo, Cr, Ta, Al alloy, or the like and may be deposited by sputtering process. Next, the first metal layer 52 may be selectively patterned to form a gate line 52a (as shown in FIG. 3) arranged along a first direction, a gate pad having a predetermined area at one end of the gate line 52a, and a gate electrode extending from the gate line 52a. Next, a gate insulating layer 53 is formed over the entire surface of the lower substrate 50 and on the gate line 52a. In one aspect of the present invention, the gate insulating layer 53 may be formed out of a material such as $SiN_x$, $SiO_x$, and the like, by a deposition method such as Plasma Enhanced Chemical Vapor Deposition (PECVD). In another aspect of the present invention, the gate insulating layer 53 may be formed of a material such as BenzoCycloButene (BCB), acrylic resin, polyimide compound, and the like, to obtain an LCD device having an increased high aperture ratio.

Next, the gate insulating layer 53 and the organic insulation layer 51 may be selectively etched to expose portions of the lower substrate 50 in regions corresponding to the pixel region and to form an inclined sidewall portion in the organic insulation layer 51. In one aspect of the present invention, the inclined sidewall portion may be formed in both the organic insulation layer 51 and the gate insulating layer 53. In one aspect of the present invention, the organic insulation layer 51 may be formed out of an organic insulating material such as BenzoCycloButene (BCB), photo-acrylic resin, and the like.

Although not shown, first and second semiconductor layers (e.g., amorphous silicon and impurity doped amorphous silicon layers) may be formed over the entire surface of the lower substrate 50 to form an active layer (not shown). The first and second semiconductor layers may then selectively patterned using a mask to be formed into an island-shaped active layer (not shown) above the gate electrode.

Figure 7B:
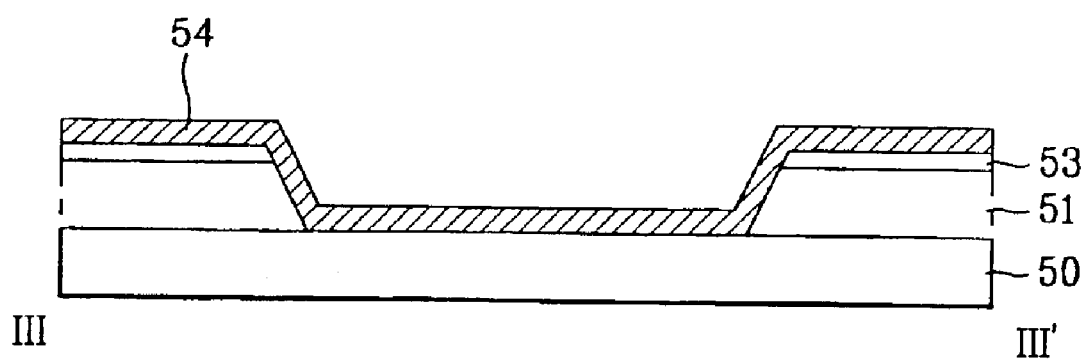

Referring to FIG. 7B, a second metal layer 54 may be formed over the entire surface of the lower substrate 50 and on the active layer (not shown).

Figure 7C:
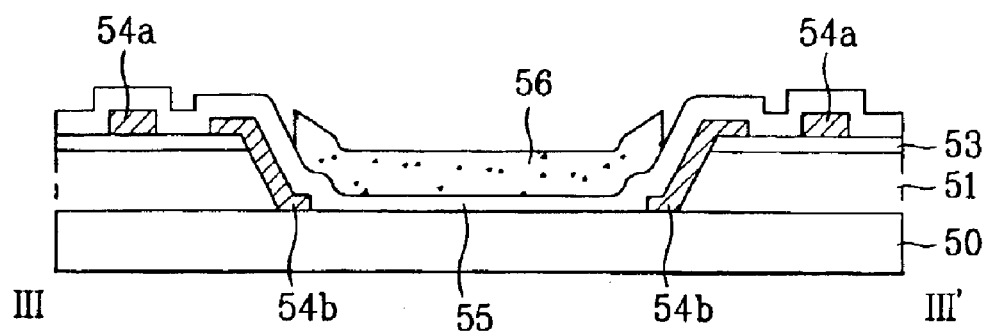

Referring to FIG. 7C, the second metal layer 54 may be selectively patterned to form the data line 54a arranged along a second direction, substantially perpendicular to the first direction, to define the pixel region, wherein the data line includes data pads (not shown) arranged at opposing ends of the data line 54a, and a common auxiliary electrode 54b on the inclined sidewall portion of the organic insulation layer 51 and substantially surrounding the pixel region. In one aspect of the present invention, the second metal layer 54 may be formed out of a material such as Al, Mo, Cr, Ta, Al alloy, and the like, by a process such as sputtering.

Although not shown, a source electrode may be formed to extend from the data line 54a toward the active layer, and a drain electrode (not shown) may be formed to be spaced apart from the source electrode. During patterning of the second metal layer 54, the second semiconductor layer may become over-etched between the source and drain electrodes.

After patterning the second metal layer, a passivation layer 55 may be formed over the entire surface of the lower substrate 50, on the data line 54a, and on the common auxiliary electrode 54b. In one aspect of the present invention, the passivation layer 55 may be formed out of a material such as BenzoCycloButene (BCB), acrylic resin, polyimide compound, $SiN_x$, or $SiO_x$, and the like. After being formed over the lower substrate 50, the passivation layer 55 may be selectively etched using a photo-mask process to form so that first, second, and third contact holes (not shown) above the drain electrode, the gate pad, and the data pad, respectively.

Next, a transparent conductive metal layer may be formed over the passivation layer 55 and within the first, second, and third contact holes. Accordingly, a portion of the transparent conductive metal layer provided in the pixel region (i.e., the pixel electrode 56) electrically contacts the drain electrode through the first contact hole, a portion of the transparent conductive metal layer provided on the passivation layer and adjacent the second contact hole (i.e., gate pad terminal) may contact the gate pad, and a portion of the transparent conductive metal layer provided on the passivation layer and adjacent the third contact hole (i.e., data pad terminal) may contact the date pad. In one aspect of the present invention, the pixel electrode 56 may be formed to overlap with at least a portion of the common auxiliary electrode 54b formed on the inclined sidewall portion of the organic insulation layer 51.

A method for fabricating the upper substrate 40 will now be described.

Figure 7D:
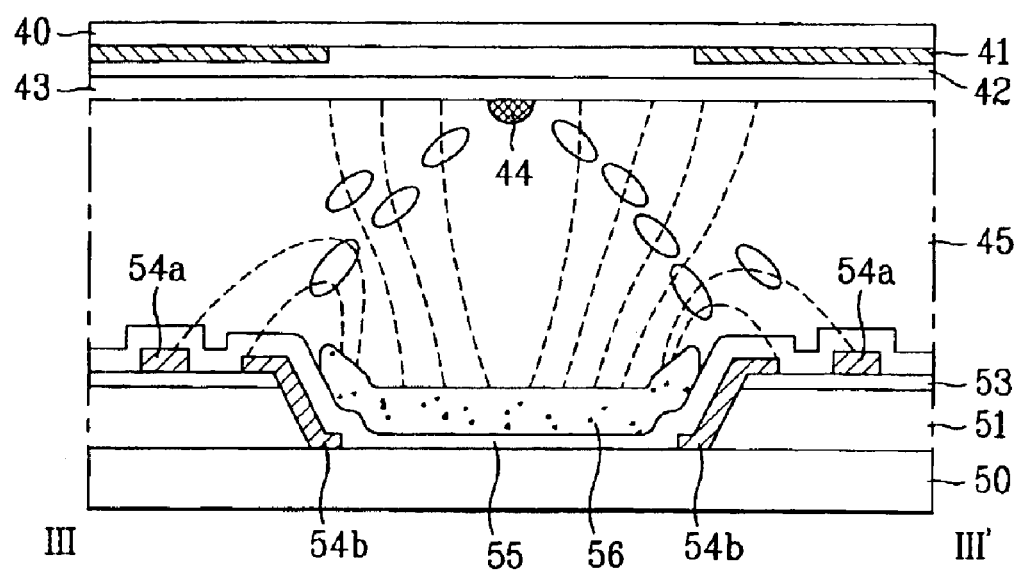

Referring to FIG. 7D, a black matrix layer 41 may be formed over the upper substrate 40 for preventing light leakage in regions outside the pixel regions of the lower substrate. Next, an RGB color filter layer 42, for selectively transmitting light at predetermined wavelengths through respective pixel regions.

Next, a common electrode 43 may be formed over the entire surface of the upper substrate 40 and on the color filter layer 42. In one aspect of the present invention, the common electrode 43 may be formed out of transparent conductive material such as ITO.

Subsequently, a photosensitive material may be formed over the common electrode 43 and selectively patterned by photolithography to form dielectric protrusion 44. According to the principles of the present invention, the dielectric protrusion 44 may distort electric fields applied to the layer of liquid crystal material 45. In one aspect of the present invention, the dielectric protrusion 44 may be formed of a photosensitive material having a dielectric constant substantially equal to or less than the dielectric constant of the liquid crystal material. For example, the dielectric protrusion 44 may be formed out of a material having the dielectric constant of about 3 or less. Accordingly, the dielectric protrusion 44 may be formed out of a material such as photoacrylate, BenzoCycloButene (BCB), and the like. In another aspect of the present invention, an electric field inducing window (not shown) may be provided as a hole or slit within the common electrode 43 as an alternative to forming the dielectric protrusion 44.

Next, a spacer (not shown) and sealant material may be formed on one of the lower and upper substrates 50 and 40 followed by bonding of the lower and upper substrates 50 and 40. Subsequently, liquid crystal material may be injected between the lower and upper substrates 50 and 40, thereby forming a layer of liquid crystal material 45. In one aspect of the present invention, the liquid crystal material may have either a positive or negative dielectric anisotropy. In another aspect of the present invention, a chiral dopant may be added to the liquid crystal material 45.

In a third aspect of the present invention, the common auxiliary electrode may be formed above the pixel electrode 56, separately from the formation of both the gate and data lines. Accordingly, the common auxiliary electrode according to the third aspect of the present invention may be formed over the inclined sidewall portion of the organic insulation layer 51.

According to the principles of the present invention, the common auxiliary electrode may be formed over the inclined sidewall portion of the organic insulation layer such that at least a portion of the common auxiliary electrode is inclined. Accordingly, liquid crystal molecules within the layer of liquid crystal material may be prevented from facing outwardly proximate the perimeter of the pixel region such that the liquid crystal molecules are substantially aligned uniformly. As a result, the time required for the layer of liquid crystal material 45 to stabilize within the LCD device, and therefore the response time, may be reduced.

According to further principles of the present invention, the common auxiliary electrode, formed on the inclined sidewall portion of the organic insulation layer, reinforces the fringe field. As a result of the reinforcement, liquid crystal molecules may be prevented from facing outwardly at the perimeter of the pixel electrode 56 such that liquid crystal molecules are uniformly aligned. As a result, the LCD device of the present invention may have an increased aperture ratio.

According to further principles of the present invention, the common auxiliary electrode may be formed simultaneously with the gate line or the data line, thereby simplifying the manufacturing process steps.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An LCD device, comprising:

first and second substrates;

an insulation layer on the first substrate, the insulation layer having an inclined sidewall portion exposing a portion of the first substrate;

gate and data lines crossing each other to define pixel regions on the first substrate;

a common auxiliary electrode on the inclined sidewall portion of the insulation layer;

a pixel electrode on the first substrate;

a common electrode on the second substrate; and a liquid crystal layer between the first and second substrates.

2. The device of claim 1, wherein the common auxiliary electrode is formed on the same layer as the gate line.

3. The device of claim 1, wherein the common auxiliary electrode is formed out of the same material as the gate line.

4. The device of claim 1, wherein the common auxiliary electrode is formed on the same layer as the data line.

5. The device of claim 1, wherein the common auxiliary electrode is formed out of the same material as the data line.

6. The device of claim 1, wherein the common auxiliary electrode overlaps at least a portion of the perimeter of the pixel electrode.

7. The device of claim 1, wherein the insulation layer comprises an organic insulation material selected from the group consisting of BenzoCycloButene (BCB) and photoacrylic resin.

8. The device of claim 1, further comprising at least one dielectric protrusion on the common electrode.

9. The device of claim 8, wherein the at least one dielectric protrusion is separately formed on the common electrode.

10. The device of claim 1, further comprising an electric field inducing window within the common electrode.

11. A method for manufacturing an LCD device, comprising:

providing a first substrate;

providing a second substrate;

forming an insulation layer on the first substrate, the insulation layer having an inclined sidewall portion exposing a portion of the first substrate;

forming gate and data lines to cross each other on the insulation layer;

forming a common auxiliary electrode on the inclined sidewall portion of the insulation layer;

forming a passivation layer and a pixel electrode on the first substrate; and forming a common electrode on the second substrate.

12. The method of claim 11, wherein the insulation layer comprises one of BenzoCycloButene (BCB) and photoacrylic resin.

13. The method of claim 11, further comprising forming the common auxiliary electrode and the gate line out of the same material.

14. The method of claim 11, further comprising forming the common auxiliary electrode and the data line out of the same material.

15. The method of claim 11, wherein the common auxiliary electrode overlaps at least a portion of the perimeter of the pixel electrode.

16. The method of claim 11, further comprising forming a dielectric protrusion on the common electrode.

17. The method of claim 11, further comprising forming an electric field inducing window within the common electrode.

18. A method for manufacturing an LCD device, comprising:

providing a first substrate;

forming an insulation layer on the first substrate, the insulating layer having an inclined sidewall portion exposing a portion of the first substrate;

forming a gate line along a first direction on the insulation layer and a common auxiliary electrode on the inclined sidewall portion of the insulation layer;

forming a gate insulating layer on the first substrate;

forming a data line along a second direction on the gate insulating layer, the second direction being substantially perpendicular to the first direction;

forming a passivation layer on the first substrate; and forming a pixel electrode on the first substrate.

19. The method of claim 18, further comprising:

providing a second substrate opposing the first substrate;

forming a common electrode on the second substrate;

forming a dielectric protrusion on the common electrode; and forming a liquid crystal layer between the first and second substrates.

20. The method of claim 18, further comprising:

providing a second substrate opposing the first substrate;

forming a common electrode on the second substrate;

forming an electric field inducing window within the common electrode; and forming a liquid crystal layer between the first and second substrates.

21. A method for manufacturing an LCD device, comprising:

providing a first substrate;

forming an insulation layer on the first substrate;

forming a gate line on the insulation layer in one direction;

forming a gate insulating layer on the gate line;

etching the gate insulating layer and the insulation layer to form an inclined sidewall portion;

forming a data line on the gate insulating layer and a common auxiliary electrode on the inclined sidewall portion of the insulation layer;

forming a passivation layer on the first substrate; and forming a pixel electrode on the first substrate.

22. The method of claim 21, further comprising:

providing a second substrate opposing the first substrate;

forming a common electrode on the second substrate;

forming a dielectric protrusion on the common electrode;

bonding the first and second substrates together; and forming a liquid crystal layer between the first and second substrates.

23. The method of claim 21, further comprising:

providing a second substrate opposing the first substrate;

forming a common electrode on the second substrate;

forming an electric field inducing window on the common electrode; and forming a liquid crystal layer between the first and second substrates.

* * * * *